United States Patent
Matsuura et al.

(10) Patent No.: US 7,101,171 B2
(45) Date of Patent: Sep. 5, 2006

(54) MOLDING DIE FOR DISC SUBSTRATE

(75) Inventors: Osamu Matsuura, Shizuoka (JP); Kazuhiro Miura, Shizuoka (JP); Hideaki Yoshimura, Shizuoka (JP); Shinsuke Kishi, Shizuoka (JP)

(73) Assignee: Sony Disc & Digital Solutions Inc., Tokyo (JP)

( * ) Notice: Subject to any disclaimer, the term of this patent is extended or adjusted under 35 U.S.C. 154(b) by 0 days.

(21) Appl. No.: 10/311,853

(22) PCT Filed: Apr. 26, 2002

(86) PCT No.: PCT/JP02/04207

§ 371 (c)(1),
(2), (4) Date: Dec. 20, 2002

(87) PCT Pub. No.: WO02/087845

PCT Pub. Date: Nov. 7, 2002

(65) Prior Publication Data

US 2003/0147990 A1     Aug. 7, 2003

(30) Foreign Application Priority Data

Apr. 26, 2001  (JP)  ............................. 2001-129467
Aug. 14, 2001  (JP)  ............................. 2001-246144

(51) Int. Cl.
B29D 11/00     (2006.01)

(52) U.S. Cl. ...................................... 425/542; 425/810

(58) Field of Classification Search ................. 425/542, 425/810; 264/1.33, 106, 107

See application file for complete search history.

(56) References Cited

U.S. PATENT DOCUMENTS 6,238,197 B1 * 5/2001 Van Hout et al. ........... 425/165
6,464,487 B1 * 10/2002 Gabriel ....................... 425/542

FOREIGN PATENT DOCUMENTS

| EP | 08-118431 | 5/1996 |
| EP | 09-131769 | 5/1997 |
| JP | 61-95915 | 5/1986 |
| JP | 61-95919 | 5/1986 |
| JP | 3-7316 | 1/1991 |

(Continued)

OTHER PUBLICATIONS

Computer translation of JP 07-080844.*

(Continued)

*Primary Examiner*—Donald Heckenberg
(74) *Attorney, Agent, or Firm*—Rader, Fishman & Grauer PLLC; Ronald P. Kananen

(57) ABSTRACT

A resin ring 51 is press-fitted into a grove portion formed in an inner periphery surface of an interlocking ring 4. The resin ring 51 is made of a hard resin such as Teflon. The resin ring 51 as a low frictional lubricative member is interposed between the interlock ring 4 and an outer periphery ring 3. In addition, a cavity 6 as a closed space is formed between a stamper 1b as a molding surface of a fixed side mirror 1 and a mirror side molding surface 2b of a moving side mirror 2. While the moving side mirror 2 is being press-contracted to the fixed side mirror 1, when a resin material is filled into the cavity 6, the outer periphery ring 3 is slidably held in a groove of the moving side mirror 2 with predetermined clearances. In the interlock ring 4, a plurality of openings 4a which relieve gas produced by the disc resin material filled into the cavity 6 are formed.

8 Claims, 4 Drawing Sheets

FOREIGN PATENT DOCUMENTS

| | | |
|---|---|---|
| JP | 7-80844 | 3/1995 |
| JP | 7-130010 | 5/1995 |
| JP | 8-229990 | 9/1996 |
| JP | 8-281661 | 10/1996 |
| JP | 2000-48416 | 2/2000 |
| JP | 2000-218657 | 8/2000 |
| JP | 2001-79896 | 3/2001 |
| WO | WO 99/37471 A | 7/1999 |

OTHER PUBLICATIONS

Computer translation of JP 2000-048416.*
Supplementary EPO Search Report dated May 17, 2004.
International Search Report, dated Jul. 29, 2002.

* cited by examiner

MOLDING DIE FOR DISC SUBSTRATE

TECHNICAL FIELD

The present invention relates to a molding die for a disc substrate, in particular, that using injection-molding.

BACKGROUND ART

For computer's storing units and so forth, disc shaped record mediums such as reproduction-only optical discs, magneto-optical discs, and phase-change type optical discs (hereinafter, these record mediums are referred to as optical discs) to and from which information signals are written and read using light have been becoming common. A conventional optical disc is composed of a disc substrate made of resin. For example, a compact disc is composed of a disc substrate having a thickness of 1.2 mm and on which signals were recorded as a pattern of concave and convex portions (pits). A DVD is composed of two disc substrates having a thickness of 0.6 mm which are adhered to one another.

A disc substrate is produced by injection-molding a heated and molten resin material. For example, a pellet-shaped resin material is sufficiently dried by a drying unit. After moisture of the resin material is sufficiently removed, it is placed in an injection molding unit. Thereafter, the resin material is supplied to a cylinder of the injection molding unit. The resin material is heated and molten by the cylinder. The heated and molten resin material is injected into a closed space formed in a disc substrate molding portion (hereinafter, the closed space is referred to as a cavity). In the cavity, a stamper is disposed. By solidifying the resin material, a concave and convex pattern of the stamper is transferred to the resin material. As a result, a disc substrate is produced.

A molding die for a disc substrate is composed of a fixed side mirror which molds one main surface of a substrate, a moving side mirror which molds the other main surface of the substrate, and an outer periphery ring which molds an outer periphery portion of the substrate. FIG. 1 is a sectional view showing a conventional die. The die is composed of a fixed side die member 101 and a moving side die member 104.

The fixed side die member 101 is disposed in an injection molding unit main body (not shown) in such a manner that the fixed side die member 101 is fixed thereto. A sprue bush 102 which has a path for a molten resin material is fitted into the fixed side die member 101. In the sprue bush 102, a resin injection opening 102a is formed. The resin injection opening 102a is positioned at the center of a molding cavity 103. The resin injection opening 102a injects a molten synthesized resin material such as polycarbonate resin supplied from the injection unit side into the cavity 103.

The moving side die member 104 is disposed in such a manner that it can moved to and from the fixed side die member 101 (in the left and right directions in FIG. 1). On the moving side die member 104, a molding surface 104b of a moving side mirror 104d is disposed in opposition to a stamper 101b which forms a molding surface of a fixed side mirror 101d. A center punch which punches a center opening into the molded substrate and protruding members 106a and 106b which are positioned on an outer periphery side and an inner periphery side of the center punch 105 and remove the molded substrate from the cavity 103 are disposed in the moving side die member 104.

An outer periphery ring 107 is formed in a ring shape. The outer periphery ring 107 is slidably disposed in a groove formed by an interlock ring 108 on an outer periphery side of the moving side mirror 104d. When the fixed side die member 101 is contacted with the moving side die member 104, the cavity 103 is formed between the stamper 101b, which is the molding surface of the fixed side mirror 101d, the molding surface 104b of the moving side mirror 104d, and the outer periphery ring 107. Portions 101c, 102b, 104c, and 105a are temperature adjusting circuits formed in the fixed side mirror 101d, the sprue bush 102, the moving side mirror 104d, and the center punch 105, respectively. In the interlock ring 108, a plurality of gas relief openings 109 which relieve gas produced by the resin material filled in the cavity 103 are formed.

When a disc substrate is produced by such a die using the injection molding method, since small gaps are formed in engagement portions 110a and 110b of the outer periphery surface of the moving side mirror 104d and the inner periphery surface of the outer periphery ring 107 (hereinafter the gaps are referred to as clearances), an outer periphery portion of the produced disc substrate is burred in a direction perpendicular to the substrate. In the case of a DVD, the burring prevents two disc substrates from being adhered. In addition, when a label is printed on a disc, the printing block may be caught by the burring. Although the engagement portions 110a and 110b represent the same ring-shaped engagement portion, for an easy explanation, they have been designated by different reference numerals.

As with the example shown in FIG. 1, when the outer periphery ring 107 is structured as a sliding ring, in order to suppress the outer periphery of the disc substrate from being burred, it is necessary to decrease the clearance formed between the inner periphery surface of the outer periphery ring 107 and the outer periphery surface of the moving side mirror 104d. However, when the clearance is small, there is a possibility of which the outer periphery ring 107 cannot be smoothly slid. Thus, even if the clearance cannot be completely removed, it is necessary to suppress the outer periphery portion of the disc substrate from being burred as much as possible.

In order to suppress the outer periphery portion of the disc substrate from being burred, it is necessary to cause the sizes of the clearances of the ring-shaped engagement portions represented by the engagement portions 110a and 110b to become equal. In an example shown in FIG. 2, the size of a clearance of an engagement portion 110a is different from the size of a clearance of an engagement portion 110b. Thus, the sizes of the clearances are not equal. In this case, the larger clearance the engagement portion has, the more burred the outer periphery portion of the disc substrate is. Consequently, the forgoing problems become more remarkable.

In order to suppress the outer periphery portion of the disc substrate from being burred, a precise sliding structure may be accomplished by a bearing or the like interposed between an outer periphery ring 107 and a moving side mirror 104d so as to cause the sizes of the clearances to become equal on the entire periphery of the outer periphery ring 107.

However, when a bearing is disposed on the clearance side of the outer periphery ring, an operating trouble may take place in the bearing in such a manner that gas produced by resin filled in the cavity is solidified and adhered to a metal portion of the bearing and thereby the bearing does not operate. When the operating trouble takes place in the bearing, the dead weight of the moving side cast member causes engagement clearances to deviate. As a result, since the outer periphery of the outer periphery ring and the inner periphery of the interlock ring get worn, the maintenance period cannot be prolonged as an inconvenient problem. In order to prevent a solidified substance of gas from being adhered to the bearing, a structure in which the bearing is disposed outside the outer periphery ring may be considered. In this case, however, the bearing tends to be collapsed by the pressure of the injected resin material. In other words, the structure in which the bearing is interposed does not provide a preferable solution for suppressing the outer periphery portion of the disc substrate from being burred.

Therefore, an object of the present invention is to provide a molding die for a disc substrate which allows the clearances of the engagement portions formed by the outer periphery ring and the moving side mirror to be equal and the outer periphery portion of the disc substrate to be suppressed from being burred.

DISCLOSURE OF THE INVENTION

To solve the above-described problem, the present invention is a molding die for a disc substrate, the molding die having a fixed die member, a moving die member, and an outer periphery ring, the fixed die member being in opposition to the moving die member, the outer periphery ring being slidably disposed in an outer periphery portion of the moving die member or the fixed die member, a stamper being disposed in a cavity formed by the fixed die member, the moving die member, and the outer periphery ring, resin being injected into the cavity and solidified, wherein the outer periphery ring is pressed from an outer periphery surface, a low frictional resin member being disposed in opposite clearances formed by the outer periphery surface of the outer periphery ring and an inner periphery surface of an interlock ring member.

Since the molding die allows the clearances formed by the inner periphery surface of the outer periphery ring and the outer periphery surface of the moving side mirror to be equal, the outer periphery portion of the disc substrate can be suppressed from being burred.

BEST MODES FOR CARRYING OUT THE INVENTION

Next, with reference to the accompanying drawings, embodiments of the present invention will be described.

Figure 3:
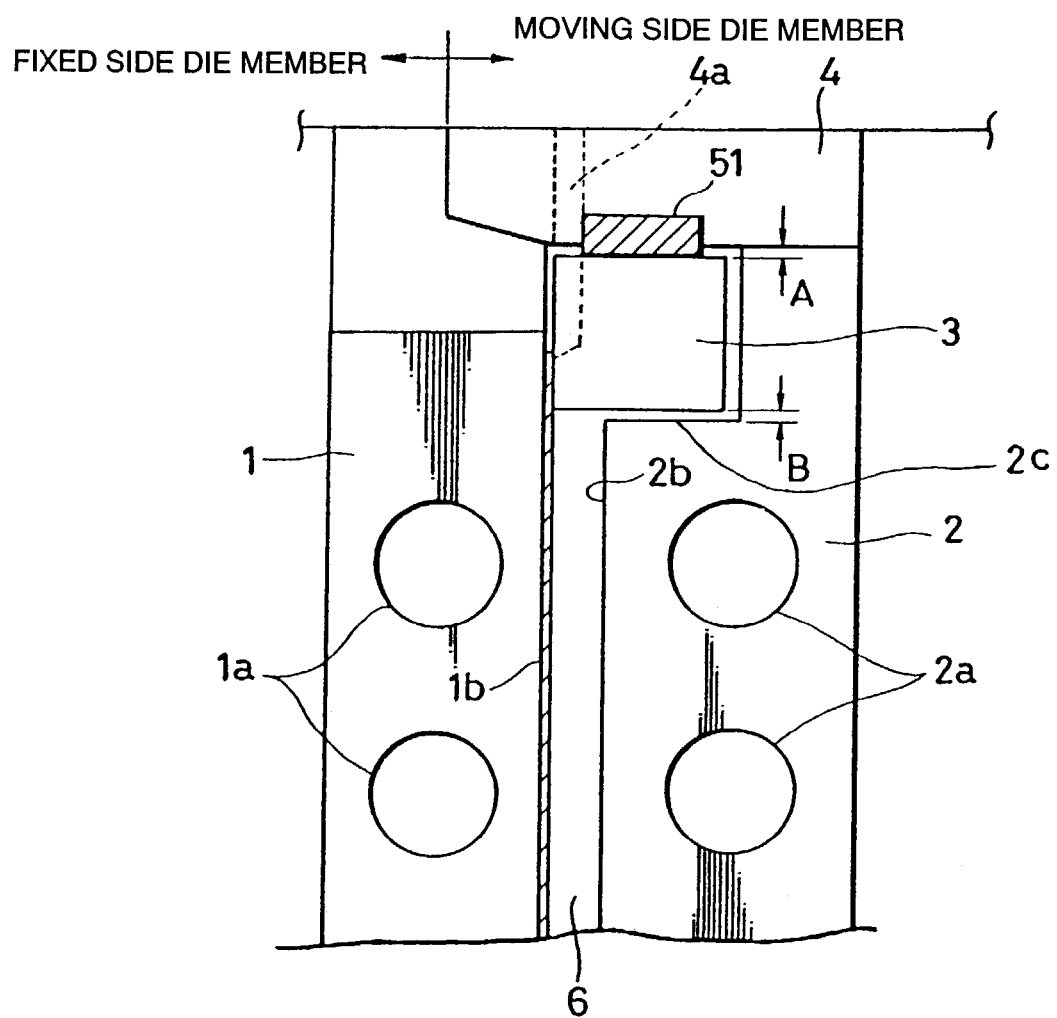
FIG. 3 is a sectional view showing principal portions of a die according to an embodiment of the present invention.

FIG. 3 is a partial sectional view showing a die according to an embodiment of the present invention. On the left side of FIG. 3, a fixed side mirror 1 is disposed. On the right side of FIG. 3, a moving side mirror 2 is disposed. An outer periphery ring 3 is disposed in opposition to an outer periphery portion of a stamper of the fixed side mirror 1. The outer periphery ring 3 is slidably fitted to a ring-shaped groove formed by the moving side mirror 2 and an interlock ring 4 which is fitted to the outside of the moving side mirror 2. The outer periphery ring 3 composes a surface for molding an outer periphery portion of a disc substrate. Reference numerals 1a and 2a represent temperature adjusting circuits disposed in the fixed side mirror 1 and the moving side mirror 2, respectively.

Figure 1:
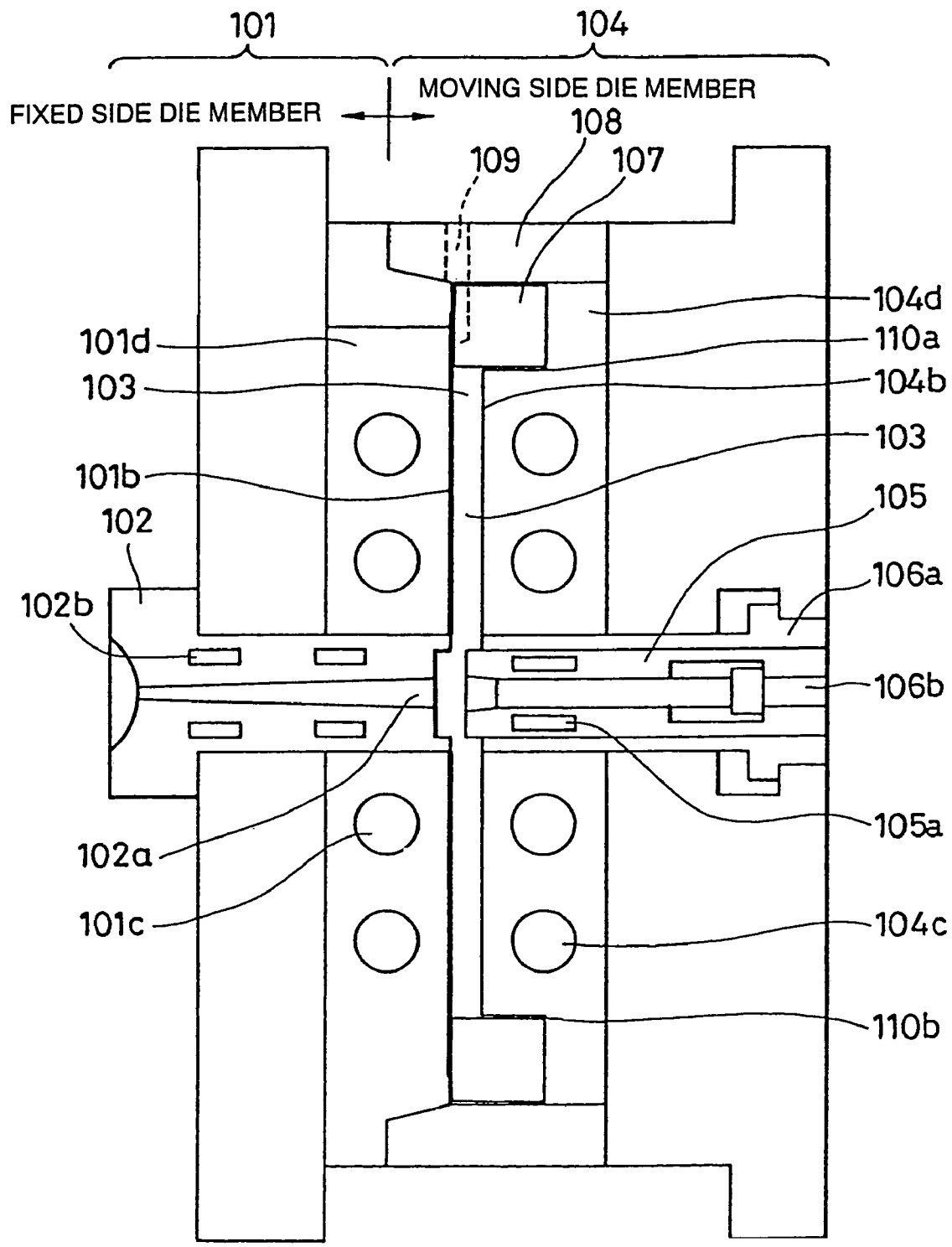
FIG. 1 is a sectional view showing principal portions of a conventional die.
Figure 2:
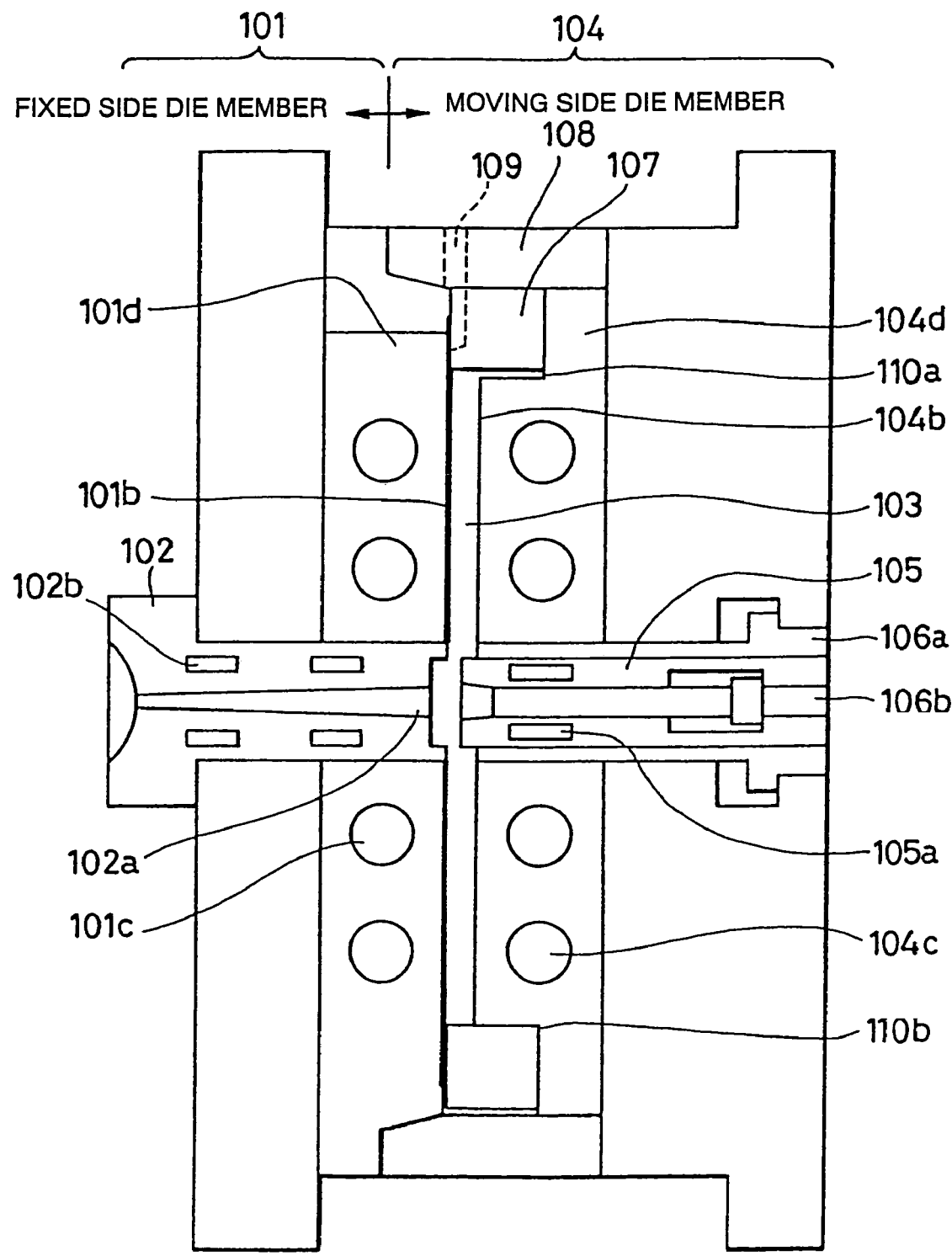
FIG. 2 is a sectional view showing principal portions of a conventional die.

On an inner periphery side of the interlock ring 4, a groove portion is formed. A resin ring 51 is press-fitted into the groove portion. The resin ring 51 is made of a hard resin for example polytetrafluoroethylene (Teflon (trademark of Dupont)). The resin ring 51 is a low frictional lubricative member interposed between the interlock ring 4 and the outer periphery ring 3. Among the outer periphery ring 3, a stamper 1b, which is a molding surface of the fixed side mirror 1, and a mirror-side molding surface 2b of the moving side mirror 2, a cavity 6 as a closed space is formed. While the moving side die member is being press-contacted to the fixed side die member, when the resin material is filled into the cavity 6, the outer periphery ring 3 is slidably held in the ring-shaped groove formed by the moving side mirror 2 and the interlock ring 4, which is fitted to the outside of the moving side mirror 2 with a predetermined clearance. In the interlock ring 4, a plurality of openings 4a are formed. The openings 4a relieve gas produced by the resin material of the disc filled in the cavity 6. Since the structure of the other portion of the mode according to the embodiment is the same as the structure of those of the conventional die shown in FIG. 1, the description will be omitted.

The conventional outer periphery ring 3 is structured as a part having a small L/D (ratio of Length and Diameter) made of a hard material such as a quenching material. The outer periphery ring 3 is used to strictly restrict the shape of the outer periphery of a disc substrate molded in the cavity 6. Thus, when two metals such as the outer periphery ring 3 and the interlock ring 4 are directly contacted, it is difficult to smoothly move the outer periphery ring 3 with low outer force. However, since the low frictional lubricative member such as the resin ring 51 is interposed, even if clearances between the outer periphery ring 3 and the interlock ring 4 are small, the outer periphery ring 3 can be smoothly slid in the groove of the moving side mirror 2.

Since the material of the resin ring 51 is a low frictional lubricative plastic, the engagement clearances between the outer periphery ring 3 and the interlock ring 4 can be removed. In addition, clearances A between the interlock ring 4 and the outer periphery ring 3 and clearances B between an outer periphery surface 2c of the moving side mirror 2 and the outer periphery ring 3 can be kept in proper sizes.

In addition, since the resin ring 51 has constant elasticity, force which equally presses the outer periphery ring 3 toward the center thereof takes place. Even if the pressure of the resin material injected into the cavity 6 is applied to the resin ring 51, it can be easily restored to the original state. In other words, since the deviation of the outer periphery ring 3 from the center position of the cavity 6 caused by the injection pressure is suppressed by the resin ring 51 interposed between the interlock ring 4 and the outer periphery ring 3, the sizes of the clearances B can be kept equal in the entire periphery of the outer periphery ring 3. As a result, the sizes of the burring on the outer periphery surface of the disc substrate caused by the clearances B become equal. Consequently, the sizes of the burring can be decreased.

In addition, since the resin ring 51 functions as a packing, the gas can be securely relieved from the cavity 6 through the openings 4a of the interlock ring 4. Thus, the gas is not adhered to the outer sliding surface of the outer periphery ring 3. Even if a component of the gas is solidified and adhered to the sliding surface, since the clearances A between the interlock ring 4 and the outer periphery ring 3 can be large, it can be smoothly slid in a long time operation of the mold.

Thus, according to the foregoing embodiment, since the clearances can be prevented from deviating, the outer periphery portion of the disc substrate can be prevented from being largely burred.

Figure 4:
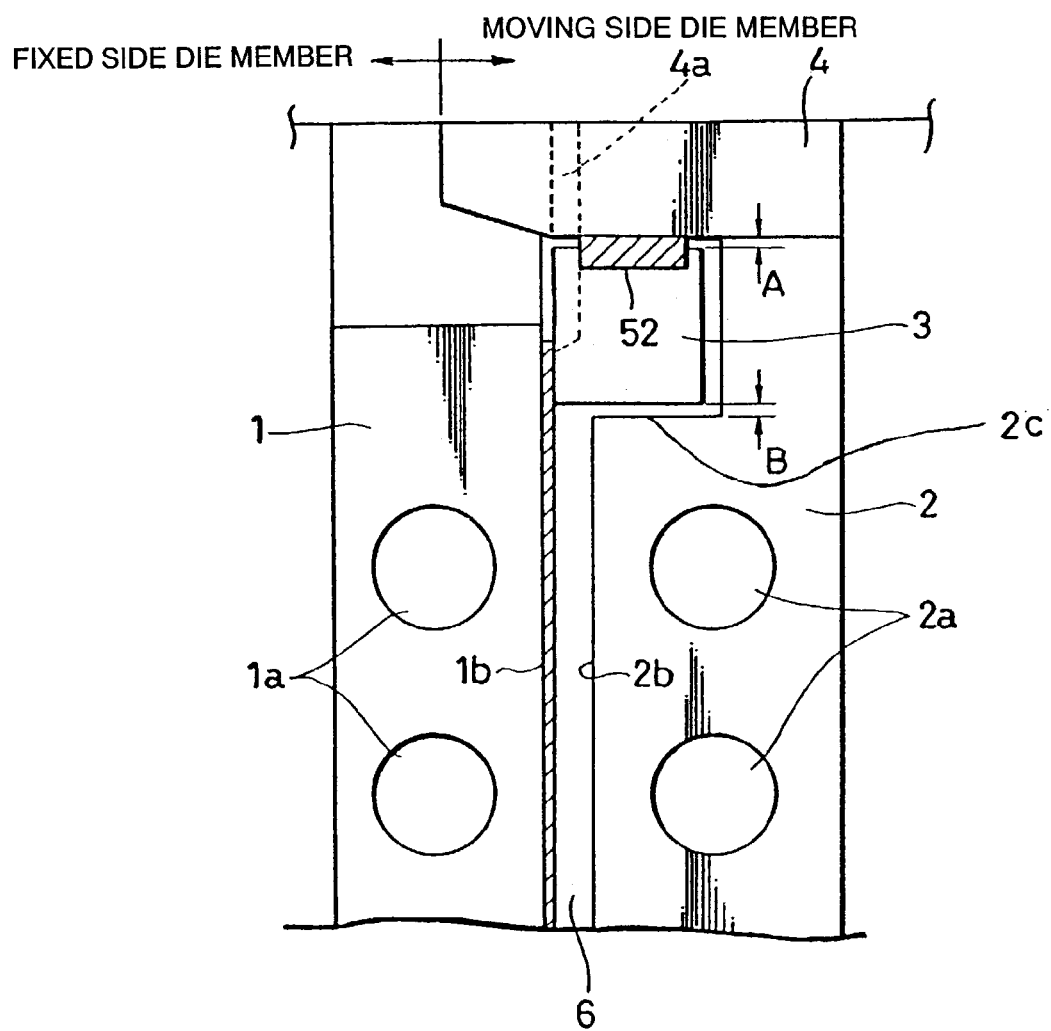
FIG. 4 is a sectional view showing principal portions of a die according to another embodiment of the present invention.

FIG. 4 is a sectional view showing a die according to another embodiment of the present invention. Like the foregoing embodiment, according to the other embodiment, an outer periphery ring 3 is slidably fitted in a ring-shaped groove formed by a moving side mirror 2 and an interlock ring 4 that is fitted to the outside of the moving side mirror 2 so that the outer periphery ring 3 is in opposition to an outer periphery portion of a disc substrate of a fixed side mirror 1.

Unlike with the foregoing embodiment, according to the other embodiment, a resin ring 52 as a low frictional lubricative member is press-fitted into a groove portion on an outer periphery side of the outer periphery ring 3. Thus, the resin ring 52 is press-contacted to an inner periphery surface of the interlock ring 4. Since the resin ring 52 is interposed as the low frictional lubricative member, the outer periphery ring 3 can be slidably held in a ring-shaped groove formed by the moving side mirror 2 and the interlock ring 4 that is fitted to the outside of the moving side mirror 2. As with the resin ring 51 of the foregoing embodiment, the resin ring 52 of the other embodiment is made of a hard resin for example Teflon (trade mark of Dupont). The structure of the other portions of the other embodiment is the same as the structure of the other portions of the foregoing embodiment.

The present invention is not limited to the above-described embodiments. In other words, without departing from the spirit and scope of the present invention, it covers various modifications and substitutions. For example, in the above-described two embodiments, dies, of which the outer periphery ring 3 is disposed in the ring-shaped groove formed by the moving side mirror 2 and the interlock ring, which is fitted in the outside of the moving side mirror 2, were described. Alternatively, an outer periphery ring may be disposed in the fixed side mirror 1. In addition, as the low frictional lubricative members, examples using the resin rings 51 and 52 were described. Alternatively, a resin material may be buried in the inner periphery surface of the interlock ring 4 or the outer periphery surface of the outer periphery ring 3 in a spot shape at predetermined intervals.

As was described above, according to the present invention, molding dies for disc substrates which suppress the outer periphery portions of the disc substrates from being burred and which are operated in a long time can be provided.

The invention claimed is:

1. A molding die for a disc substrate, the molding die having:
   a fixed die member,
   a moving die member having a ring-shaped groove formed by a moving side mirror and an interlock ring which is fitted to an outside of the moving side mirror;
   an outer periphery ring disposed in opposition to an outer periphery portion of said fixed die member, the fixed die member being in opposition to the moving die member, the outer periphery ring being slidably disposed in an outer periphery portion of the moving die member or the fixed die member,
   a stamper being disposed in a cavity formed by the fixed die member, the moving die member, and the outer periphery ring, resin being injected into the cavity and solidified, wherein
   a low frictional resin ring with a substantially rectangular cross section is disposed in opposite clearances formed by the outer periphery surface of the outer periphery ring and an inner periphery surface of the interlock ring so that structurally the outer periphery ring is pressed from an outer periphery surface and at the same time can be smoothly slid in the ring-shaped groove, for the reason that, when resin is injected into the cavity, clearances A between the interlock ring and the outer periphery ring can be large and clearances B between an outer periphery surface of the moving side mirror and the outer periphery ring can be kept equal along the entire periphery of the outer periphery ring.

2. The molding die as set forth in claim 1,
   wherein the resin ring is press-fitted into a groove formed in the inner periphery surface of the interlock ring.

3. The molding die as set forth in claim 1,
   wherein the resin ring is press-fitted into a groove formed in the outer periphery surface of the outer periphery ring.

4. The molding die as set forth in claim 1,
   wherein the resin ring is made of polytetrafluoroethylene.

5. The molding die as set forth in claim 1,
   wherein the low frictional resin ring has a substantially constant elasticity so that force equally presses the outer periphery ring toward the center thereof and deviation of the outer periphery ring from the center position of the cavity caused by the injection pressure is suppressed by the resin member.

6. A molding die for a disc substrate, the molding die having a fixed die member, a moving die member, and an outer periphery ring, the fixed die member being in opposition to the moving die member, the outer periphery ring being slidably disposed in an outer periphery portion of the moving die member or the fixed die member, a stamper being disposed in a cavity formed by the fixed die member, the moving die member, and the outer periphery ring, resin being injected into the cavity and solidified,
   wherein a low frictional resin ring with a substantially rectangular cross section and made from polytetrafluoroethylene is disposed in opposite clearances formed by the outer periphery surface of the outer periphery ring and an inner periphery surface of an interlock ring member so that structurally
   the outer periphery ring is pressed from an outer periphery and at the same time is smoothly slid in the groove formed by a moving side mirror and the interlock ring member which is fitted to an outside of the moving side mirror, so that when resin is injected into the cavity, clearances A between the interlock ring and the outer periphery ring are large and clearances B between an outer periphery surface of the moving side mirror and the outer periphery ring are kept equal along the entire periphery of the outer periphery ring.

7. The molding die as set forth in claim 6,
   wherein the resin ring member is press-fitted into a groove formed in the inner periphery surface of the interlock ring member.

8. The molding die as set forth in claim 6,
   wherein the resin ring is press-fitted into a groove formed in the outer periphery surface of the outer periphery ring.

* * * * *